United States Patent
Xu et al.

(10) Patent No.: US 10,795,753 B2
(45) Date of Patent: Oct. 6, 2020

(54) LOG-BASED COMPUTER FAILURE DIAGNOSIS

(71) Applicant: NEC Laboratories America, Inc., Princeton, NJ (US)

(72) Inventors: Jianwu Xu, Titusville, NJ (US); Hui Zhang, Princeton Junction, NJ (US); Haifeng Chen, West Windsor, NJ (US); Tanay Kumar Saha, Indianapolis, IN (US); Pranay Anchuri, Princeton Junction, NJ (US)

(73) Assignee: NEC Corporation (JP)

( * ) Notice: Subject to any disclaimer, the term of this patent is extended or adjusted under 35 U.S.C. 154(b) by 148 days.

(21) Appl. No.: 16/207,851

(22) Filed: Dec. 3, 2018

(65) Prior Publication Data

US 2019/0179691 A1    Jun. 13, 2019

Related U.S. Application Data

(60) Provisional application No. 62/596,166, filed on Dec. 8, 2017.

(51) Int. Cl.
| | | |
|---|---|---|
| G06F 11/07 | (2006.01) | |
| G06K 9/62 | (2006.01) | |
| G06F 11/14 | (2006.01) | |
| G06K 9/68 | (2006.01) | |

(52) U.S. Cl.
CPC ........ *G06F 11/079* (2013.01); *G06F 11/0793* (2013.01); *G06F 11/1471* (2013.01); *G06K 9/6218* (2013.01); *G06K 9/6885* (2013.01)

(58) Field of Classification Search
CPC .......................... G06F 11/079; G06F 11/0793
USPC ........................................................... 714/39
See application file for complete search history.

(56) References Cited

U.S. PATENT DOCUMENTS

| | | | |
|---|---|---|---|
| 6,697,962 B1 | 2/2004 | McCrory et al. | |
| 6,883,120 B1 | 4/2005 | Banga | |
| 9,652,318 B2* | 5/2017 | Namkoong | G06F 11/0793 |
| 2014/0334739 A1* | 11/2014 | Umanesan | G06F 16/686 382/200 |
| 2016/0147622 A1* | 5/2016 | Nichols | G06F 11/0793 714/57 |
| 2017/0293543 A1* | 10/2017 | Xu | G06F 11/008 |

OTHER PUBLICATIONS

Rengaswamy et al., "A syntactic pattern-recognition approach for process monitoring and fault diagnosis", 1995, Engineering Applications of Artificial Intelligence, vol. 8, Issue 1, pp. 35-51 (Year: 1995).*

(Continued)

*Primary Examiner* — Chae M Ko
(74) *Attorney, Agent, or Firm* — Joseph Kolodka (57) ABSTRACT

Methods and systems for system failure diagnosis and correction include extracting syntactic patterns from a plurality of logs with heterogeneous formats. The syntactic patterns are clustered according to categories of system failure. A single semantically unique pattern is extracted for each category of system failure. The semantically unique patterns are matched to recent log information to detect a corresponding system failure. A corrective action us performed responsive to the detected system failure.

20 Claims, 6 Drawing Sheets

(56) References Cited

OTHER PUBLICATIONS

Hamooni, "LogMine: Fast Pattern Recognition for Log Analytics", Proceedings of the 25th ACM International Conference on Information and Knowledge Management, Oct. 2016, pp. 1573-1582.
Ning, "HLAer: A System for Heterogeneous Log Analysis", SDM Workshop on Heterogeneous Learning, Apr. 2014, pp. 1-22.
IPMI (Intelligent Platform Management Interface) technical specification https://www.intel.com/content/www/us/en/servers/ipmi/ipmi-home.html, accessed Sep. 2018.
Smith, "Identification of Common Molecular Subsequences", Journal of Molecular Biology, vol. 147, No. 1, Mar. 1981, pp. 195-197.
Sokal, "A Statistical Method for Evaluating Systematic Relationships", University of Kansas Science Bulletin, vol. 38, Mar. 1958 pp. 1409-1438.
Mikolov, "Distributed Representations of Words and Phrases and their Compositionality", Advances in Neural Information Processing Systems 26, Oct. 2013, pp. 1-9.
Ester, "A Density-Based Algorithm for Discovering Clusters in Large Spatial Databases with Noise", Proceedings of the 2nd International Conference on Knowledge Discovery and Data Mining, Aug. 1996, pp. 226-231.
Rousseeuw, "Silhouettes: a Graphical Aid to the Interpretation and Validation of Cluster Analysis", Computational and Applied Mathematics, vol. 20, Nov. 1987, pp. 53-65.
The rule and format of regular expression, can be referred to the website: http://www.zytrax.com/tech/web/regex.htm, page last modified Aug. 17, 2017, pp. 1-32.
Logstash: https://www.elastic.co/products/logstash, Logstash is a general log parsing engine. Given a regular expression as the format, Logstash parses the input log, Oct. 2000.
The Syslog protocol is defined by Request for Comments (RFC) documents published by the Internet Engineering Task Force (Internet standards). Syslog protocol is defined in RFC 5424. https://tools.ietf.org/html/rfc5424, Mar. 2009.
Toshiba GridData Event Pattern Analytics: http://www.toshiba.co.jp/cl/pro/bigdatapf/lineup/GridData/epa.htm, accessed Nov. 2018.
Yu, X., Joshi, P., Xu, J., Jin, G., Zhang, H., & Jiang, G. (2016). Cloudseer: Workflow monitoring of cloud infrastructures via interleaved logs. ACM SIGOPS Operating Systems Review, 50(2), 489-502, Apr. 2016.

* cited by examiner

LOG-BASED COMPUTER FAILURE DIAGNOSIS

RELATED APPLICATION INFORMATION

This application claims priority to U.S. Patent Application No. 62/596,166, filed on Dec. 8, 2017, incorporated herein by reference herein its entirety.

BACKGROUND

Technical Field

The present invention relates to computer system maintenance and, more particularly, to the diagnosis of computer system failures using data derived from heterogeneous system logs.

Description of the Related Art

Enterprise systems are made up of a great many different individual computing systems, each of which includes its own set of components and software. As technology continues to advance, these computing systems become increasingly complicated in their internal structure and in their interconnections within other computing systems. As a result, a failure in one unit of the enterprise system can propagate to other connected components. In addition, such systems often demand high availability, with minimum interruption and downtime to repair problems.

While computer systems frequently collect logs that can help with diagnosis, any given computer system may generate a tremendous number of logs, including normal records and event records that correspond to component failures. It is difficult to extract the correct failure signature from the logs to diagnose failures within enterprise systems.

SUMMARY

A method for system failure diagnosis and correction includes extracting syntactic patterns from a plurality of logs with heterogeneous formats. The syntactic patterns are clustered according to categories of system failure. A single semantically unique pattern is extracted for each category of system failure. The semantically unique patterns are matched to recent log information to detect a corresponding system failure. A corrective action us performed responsive to the detected system failure.

A system for failure diagnosis includes a failure signature module configured to extract syntactic patterns from a plurality of logs with heterogeneous formats, to cluster the syntactic patterns according to categories of system failure, and to extract a single semantically unique pattern for each category of system failure. A failure diagnosis includes a processor configured to match the semantically unique patterns to recent log information to detect a corresponding system failure. A corrective module is configured to perform a corrective action responsive to the detected system failure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention make use of heterogeneous logging sources to automatically extract log patterns for matching of normal operational logs and of failure logs. The present embodiments thereby discover a set of log patterns that originate from different types of hardware component failures. Natural language processing is used to cluster failure log patterns and to group semantically similar patterns into the same category. Automata models organize clusters to explain the failures. Multiple automata are ordered based on time stamp information to form a complete story of how the fault originates and propagates through time and across different hardware components. This helps system administrators understand the system failure mechanism and determine the correct solution. The present embodiments furthermore provide automatic failure mitigation by engaging one or more policies within the system to either prevent the failure or to prevent the failure from spreading to other components and systems.

The present embodiments thereby provide a failure diagnosis system that works for any type of log, automatically parse and analyze the logs to extract log patterns that correspond to types of failure, identify time and execution order of each failure signature cluster to describe the internal mechanism of a failure event, and organize multiple failure event signatures to form a complete description of system failure.

Figure 1:
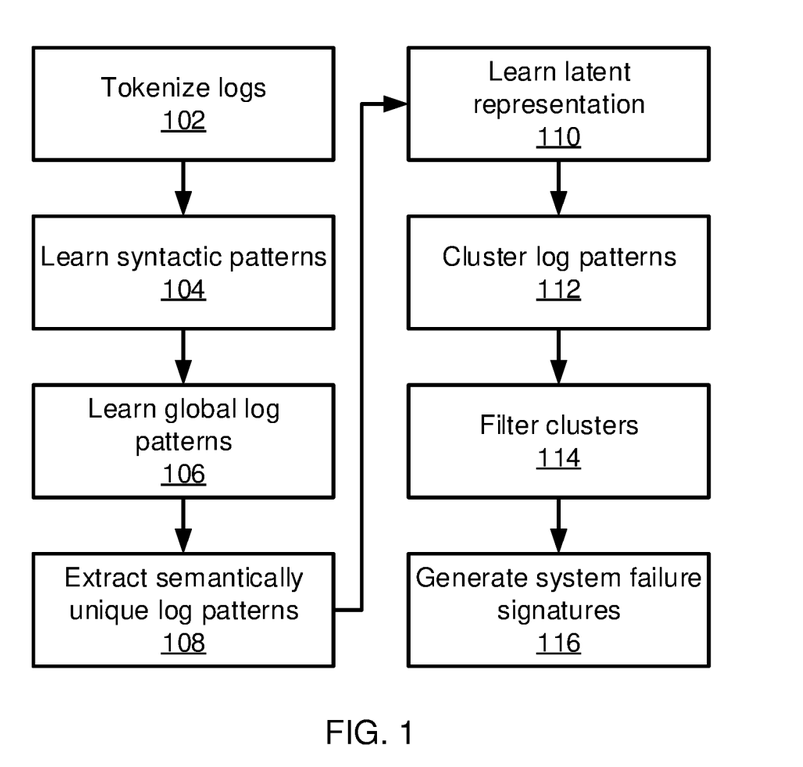
FIG. 1 is a block/flow diagram of a method for generating system failure signatures based on syntactic and semantic log patterns in accordance with an embodiment of the present invention.

Referring now in detail to the figures in which like numerals represent the same or similar elements and initially to FIG. 1, a high-level method for detecting and diagnosing system failure is illustratively depicted in accordance with one embodiment of the present invention. Block 102 accepts as input a set of labeled text logs, corresponding to failure periods and normal periods, and tokenizes the logs.

Each failure log may have a label that denotes what type of system failure it represents. This information is used in subsequent steps for identifying future failures. Each text log message may include a time stamp and a description of one or more system events, status, or other pertinent information. The text logs can be derived from multiple different logging utilities that are executed during the operation of computer systems to collect information and statistics. Label information does not need to be precise and the beginning and end times for a failure period can be estimates.

The labeled text logs can have heterogeneous formats. Exemplary formats include syslog, system event log (SEL), intelligent platform management interface (IPMI), and any other appropriate logging format. The present embodiments use unsupervised learning to automatically extract, parse, and match the heterogeneous logs without any input from human operators and can therefore be used on a wide range of applications and computer systems.

Block 102 thus tokenizes the heterogeneous text logs by splitting the original logs with a set of predefined and/or user-supplied delimiters. This can be used in both single-byte character encodings (e.g., ASCII) and multi-byte character encodings (e.g., UTF). Time stamps can be recognized and standardized to make the time format consistent between different logs.

Block 104 learns syntactic patterns in the logs, for example using unsupervised clustering that aggregates multiple tokenized logs with similar structures into clusters. A similarity measure is used to identify the clusters and may be defined as a similarity of token categories. This step merges clustered logs to produce log patterns that characterize the logs in each cluster, for example using a regular expression format. Log patterns can be aligned using, e.g., a Smith-Waterman process. A sequential merge process is used at first, and then an unweighted pair group method with arithmetic mean is used when the sequential merge starts to provide poor performance. A cost function that determines the generality of patterns is used to identify the end of the pattern recognition process, for example when the cost function has a value below a threshold value. The syntactic patterns capture the structural information of the heterogeneous logs. Each token is treated as a unit, with the log being an ordered collection of such tokens.

Block 106 learns global log patterns. The log labels are used to continuously learn, modify, synchronize, and aggregate a global log pattern dictionary, using the initial supplied logs and the latest training logs as well as the system runs in a live environment. Rather than producing a new set of log patterns from scratch every time a new set of labeled logs is available, block 106 parses recent logs with previously learned log patterns. Additional detail regarding this step is provided below.

Block 108 extracts semantically unique log patterns. The log patterns learned by block 106 are generated using syntactic information, based on the structure of the logs, and lack semantic information regarding the contents of the logs. In practice, many syntactically different, but semantically similar, log patterns can be extracted if done without consideration of log pattern semantics. Semantically unique log patterns are extracted for each failure category so that a failure signature and analysis is unique for each failure category. Additional detail on this process is provided below.

Block 110 learns a latent representation of the log patterns by generating a log pattern sequence corpus for each failure category. If multiple failure cases are available for the same failure type, the log files are first merged. Each failure category is associated with a log pattern sequence. Block 110 takes the global log pattern sequence for each failure category and produces a log pattern sequence corpus that includes multiple short sequences of log pattern identifiers. Each log pattern sequence is generated by starting from any log pattern in the original sequence and performing a linear walk.

To generate the corpus, for each log pattern identifier in a sequence, a linear walk is performed across each log pattern identifier until a log pattern identifier is repeated. If the identifier is repeated immediately, then the walk is first performed until a different identifier is obtained. If the repeated log pattern identifier is not found within a predefined number of steps, then the walk is halted and restarted using the next log pattern identifier.

This process finds that two log pattern identifiers belong to the same cluster if it can walk from one identifier to the other by a sufficiently small travel distance. In the context of fault diagnosis, if two failure event patterns, or any combination of failure and normal patterns, appear within a short traversal distance, then they will be clustered together.

Block 110 then uses the sequence corpus output to project the log patterns into a d-dimensional space. Each log pattern is then represented by a d-dimensional, real-valued vector. This latent representation encodes information about how the different log patterns are related based on the sequence corpus. The sequence information represents the contextual knowledge of different log patterns, which relates to the details of event pattern flow for system failures. The dimensional number d may be less than the number of global log patterns in the corpus sequence.

The total number of unique global log patterns is the maximum number of representation dimensions. In computer systems, this number is limited because there are only a finite number of different log patterns that are produced by the logging utilities. Because a dense representation is used for fault diagnosis, the number of representation dimensions is much smaller than the total number of unique global patterns. In exemplary embodiments, d may be between about 100 and 300.

Block 110 trains a continuous bag-of-words model (CBOW) to learn the d-dimensional representation that captures the contextual information between different log patterns for each failure category. Given a log pattern sequence, the CBOW model predicts each of the log patterns using the average of d-dimensional vector representations of the log patterns in the context window. The CBOW model can be implemented as a multi-class classification model, where the number of classes to be predicted is the same as the total number of unique event patterns. The model initializes the d-dimensional vectors uniformly at random and then uses the signal from prediction to refine the initial vector by adjusting the weights in such a way that it can correctly predict an event pattern, given a set of context patterns.

Block 112 uses the d-dimensional representation of event record patterns, with embedded contextual information, to cluster log patterns together for each failure category using density-based clustering. The clustering parameters are automatically selected. The clustering does not need to specify the number of clusters in advance and can find clusters having arbitrary shapes. A minimum distance parameter is used to find the neighboring points which can fall into a single cluster and is set using a grid search procedure using the Silhouette coefficient as the criterion. The Silhouette coefficient is an internal measure of a cluster and quantifies the quality of clustering based on inter-cluster and intra-cluster distances between points. The grid search seeks the optimal value by starting from a minimum distance of all pair distances among the event patterns, up to the average distance. The value of the minimum distance which offers the maximum value of the Silhouette coefficient is chosen as the optimal value.

The optimal minimal distance is then used, with the minimum point that specifies the number of log patterns to form a valid cluster, to perform density-based clustering.

That number of log patterns can be set to 1, for example, which means that a single log pattern can form its own cluster if none of the other log patterns fall within the minimum distance threshold.

Once block 112 has clustered the log pattern vectors, block 114 applies a filter to keep only those clusters with failure log patterns in them. These clusters correspond to different aspects of a computer system failure.

Block 116 generates failure signatures using automata modeling. The cluster outputs of block 114 include only structural information, without any temporal context of the log patterns inside each cluster. An automata model for each cluster is generated using the original log pattern sequence information. Multiple automata models are then linked based on a time ordering, so that the final linked automata model is a signature for each failure cause. Automata models represent the sequence of log patterns that occur during a system failure phase. Because logs are generated following particular software source code execution paths, the automata model describes the characteristics of the system failure phenomenon in terms of the ordered executions of different log patterns.

For each log pattern in a given failure cluster, block 116 retrieves the original log message sequences. There can be multiple log sequences corresponding to a same pattern cluster, because the same log pattern order may occur multiple times in different locations. Each automaton model describes the log pattern sequence that may have generated a failure. The automata are defined with a node for every log pattern identifier. If a log pattern identifier $P_y$ appears after log pattern identifier $P_x$, then a directed link will be generated from $P_x$ to $P_y$ in a graph structure.

The evolution of different automata over time is relevant to fault diagnosis, because the time ordering information of automata illustrates how the failure propagates during the fault period. This information offers actionable insights and helps system administrators understand root causes of failure. The time ordering is obtained by comparing the starting time stamps of each automata model. Once the ordering information is determined, the automata models are linked together as the final failure signature for a particular fault.

Figure 2:
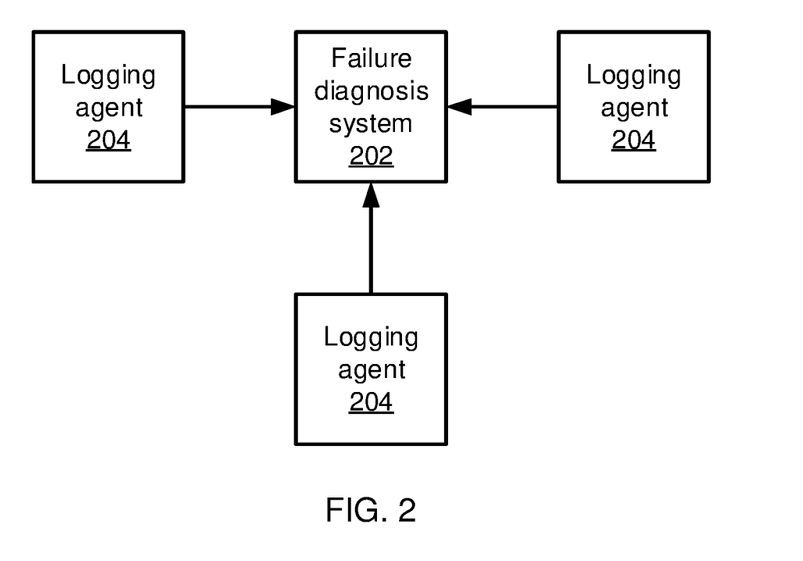
FIG. 2 is a block diagram of a failure diagnosis system in the context of reports from multiple logging agents in accordance with an embodiment of the present invention.

Referring now to FIG. 2, a system is shown that includes a number of different logging agents 204. Each logging agent 204 may represent, for example, a separate computing device, a separate monitored hardware component within a computing device, a separate monitored software component within a computing device, one or more external sensors, and any other type of log-generating entity. The logging agents 204 all provide their logs to the failure detection system 202, which collects the logs, determines failure signatures based on the logs, detects and diagnoses new failures, and takes corrective action. The different logging agents 204 may provide their logs in any appropriate format, with different logging agents 204 potentially having significantly different logging formats.

Each logging agent 204 can be connected electronically to multiple hardware units, such as a processor, memory, motherboard, etc. in a given computer system. The logging agents 204 can furthermore be connected via a network connection or by software running directly on the failure detection system. The log information can be transmitted in a streaming process, by messages, file transfers, or any other appropriate mechanism.

Figure 3:
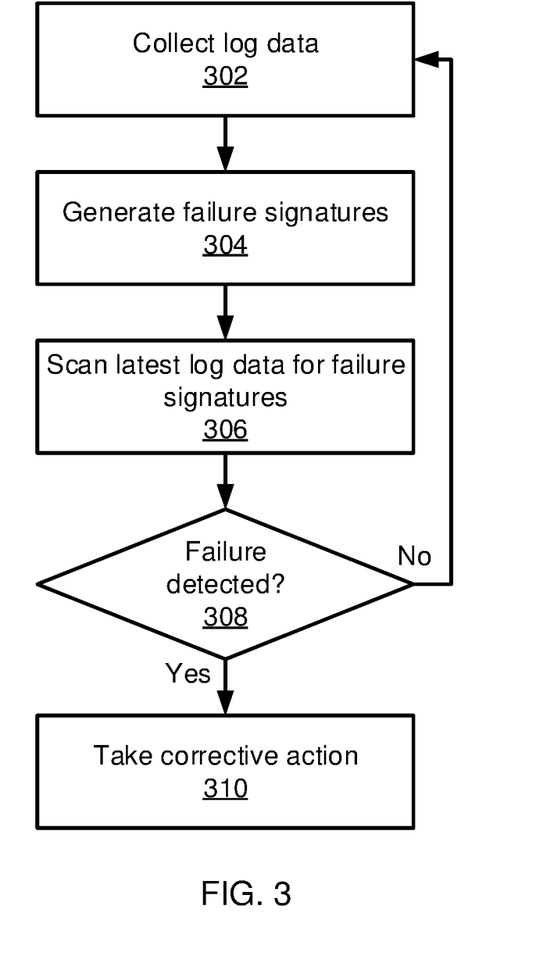
FIG. 3 is a block/flow diagram of a method for detecting and correcting a failure using system failure signatures in accordance with an embodiment of the present invention.

Referring now to FIG. 3, a method for detecting and correcting system failures is shown. Block 202 collects log data from the various logging agents 204. This can be performed continuously, as the respective logging agents provide updates to their respective log outputs, or can be performed periodically (e.g., hourly, daily, weekly, etc.). As noted above, the log data collected in block 302 can be in multiple heterogeneous log formats.

Block 304 generates failure signatures from the collected log data, as described above. Each failure signature represents a set of conditions in the logging agents 204 that provides a pattern that can be used to identify a particular variety of failure as well as its cause(s). Block 306 uses these failure signatures to scan the latest log data from the logging agents 204 to look for patterns in the log data that match the failure signature.

Block 308 determines whether a failure has been detected. If not, processing returns to block 302, where new log data is collected and used to update the failure signatures. If a failure is detected, block 310 takes corrective action. In some embodiments, the corrective action can include generating a report for a human operator or technician that identifies the source of the failure and corrective steps that can be taken to resolve the failure. In some embodiments, the corrective action can include automatically making one or more changes to system settings to prevent, mitigate, or correct the failure. For example, such changes can include shutting down a system that is generating erroneous outputs, activating a backup system, rebooting a malfunctioning system, changing power supply settings, changing cooling settings, changing security settings, etc.

Figure 4:
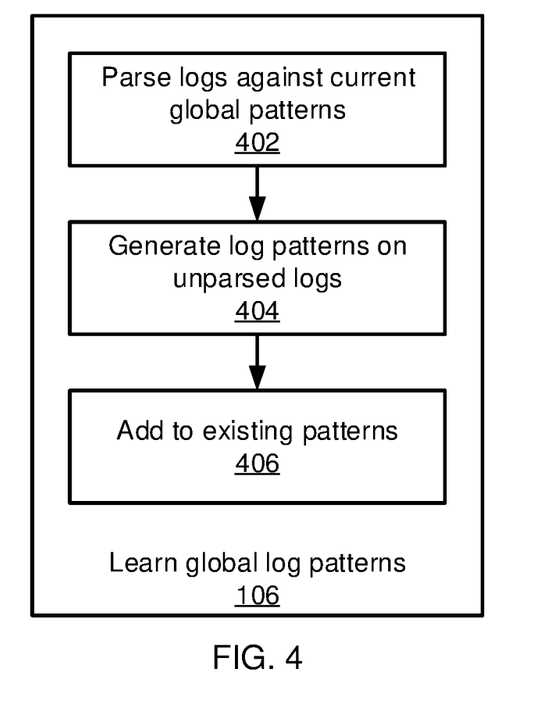
FIG. 4 is a block/flow diagram showing detail regarding learning global log patterns in accordance with an embodiment of the present invention.

Referring now to FIG. 4, additional detail is provided on the learning of global log patterns in block 106. Block 402 analyzes a set of log texts through regular expression matching. Given a list of syntactic log patterns from block 104, block 402 matches the new logs against the list of regular expressions. Only those logs that have not been matched are flagged for learning new log patterns. The logs can be parsed using any appropriate tool, including Logstash as one example.

Block 404 applies unsupervised clustering and pattern recognition on the unparsed text logs to produce log patterns which are not found in the aggregation of previous text logs. The output of block 406 is then added to the set of previously learned log patterns to form a new set of log patterns. In this fashion, the operations of block 106 can be repeated as new logs are collected to update the global log pattern set.

Figure 5:
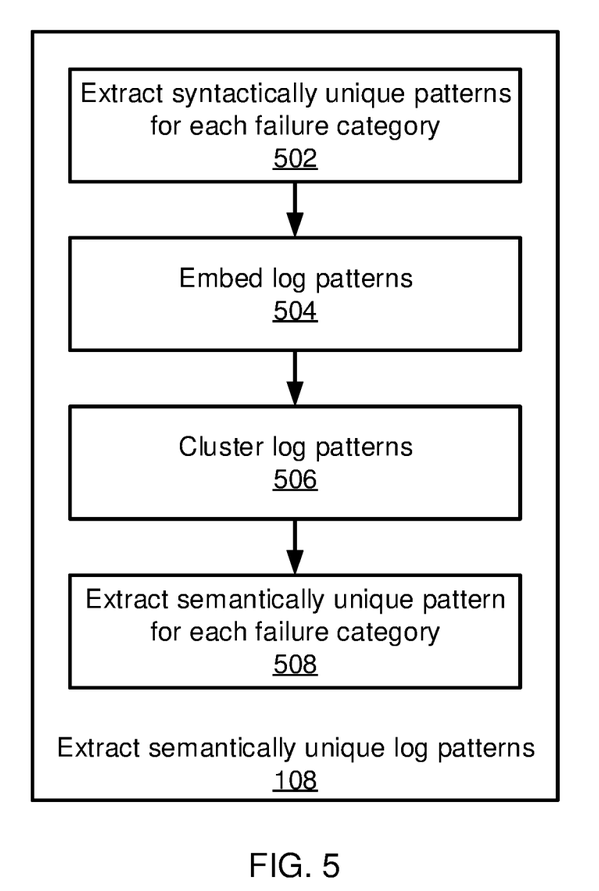
FIG. 5 is a block/flow diagram showing detail regarding the extraction of semantically unique log patterns in accordance with an embodiment of the present invention.

Referring now to FIG. 5, additional detail regarding the extraction of semantically unique log patterns in block 108 is shown. Block 502 first aggregates all log patterns based on failure classes so that each failure type will have a set of log patterns produced during the particular failure period. Block 502 uses a one-vs-all approach to obtain a set of syntactically unique log patterns for each failure category.

Blocks 504 and 506 extract the semantics among syntactically different log patterns. Because syntactic log patterns rely on token ordering and counting of all words within log messages, multiple log patterns that are syntactically different may nonetheless share similar semantics. Block 504 takes the syntactically unique patterns from block 502 and transforms them into a latent representation in a vector format, for example using the pattern2vec tool. Each unique pattern field token is assigned a corresponding vector in an embedded metric space. Because the embedded metric space supports vector algebraic operations, pattern2vec takes the average of all the corresponding vectors from pattern field tokens in a given log pattern and denotes the average as the final latent vector representation of the syntactic pattern. Once the latent vector representations of each syntactic log pattern are obtained, block 506 clusters the vectors, for example based on density-based clustering. Each cluster represents a group of log patterns with different syntax, but similar semantics. Therefore, pattern2vec considers the semantic similarity of log patterns and automatically extracts those individual clusters.

Block 508 analyzes the cluster of syntactic patterns in the latent representation space. The clusters with a single vector are retained, as these clusters include log patterns which are both syntactically and semantically different. Single-pattern clusters represent unique semantic information that can be particularly useful in system failure diagnosis. Block 508 aggregates those clusters with multiple log patterns, because only one pattern from each cluster is needed to represent the corresponding cluster. The other patterns of a given cluster share the same semantic information with different syntax.

Block 508 then uses the syntactically unique patterns from block 502 and removes log patterns from each set that correspond to each failure category if those log patterns from a cluster with ones from other sets. Those log patterns from the same cluster that correspond to different failure categories are semantically similar. The remaining log patterns become both syntactically and semantically unique after removal of the redundant patterns.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Figure 6:
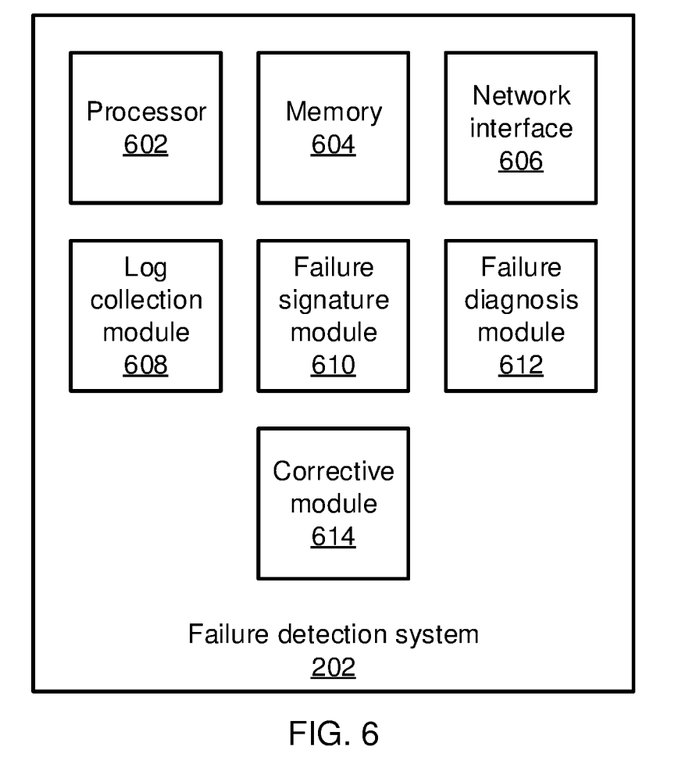
FIG. 6 is a block diagram of a failure detection system that detects and corrects failures using system failure signatures in accordance with an embodiment of the present invention.

Referring now to FIG. 6, additional detail on the failure detection system 202 is shown. The system 202 includes a hardware processor 602 and a memory 604. A network interface 606 is included to communicate with logging agents 204 over any appropriate communications medium and protocol to obtain the log data. The system 202 may also include one or more functional modules. In some embodiments, the functional modules may be implemented as software that is stored in memory 604 and executed by hardware processor 602. In other embodiments, one or more of the functional modules may be implemented as one or more discrete hardware components in the form of, e.g., application specific integrated chips or field programmable gate arrays.

A log collection module 608 uses the network interface to obtain log information from the logging agents 204. In embodiments where the logging agents 204 are implemented within the same computing system as the failure detection system 202, then the log collection module 608 obtains the log information from locations in memory 604 where the logs are stored. A failure signature module 610 uses the collected log information to determine patterns signatures for specific kinds of system failure. A failure diagnosis module 612 then uses the failure signatures to detect and recognize failures before they happen and to diagnose the cause of an existing failure. A corrective module 614 takes an action to prevent, mitigate, or correct the system failure.

Figure 7:
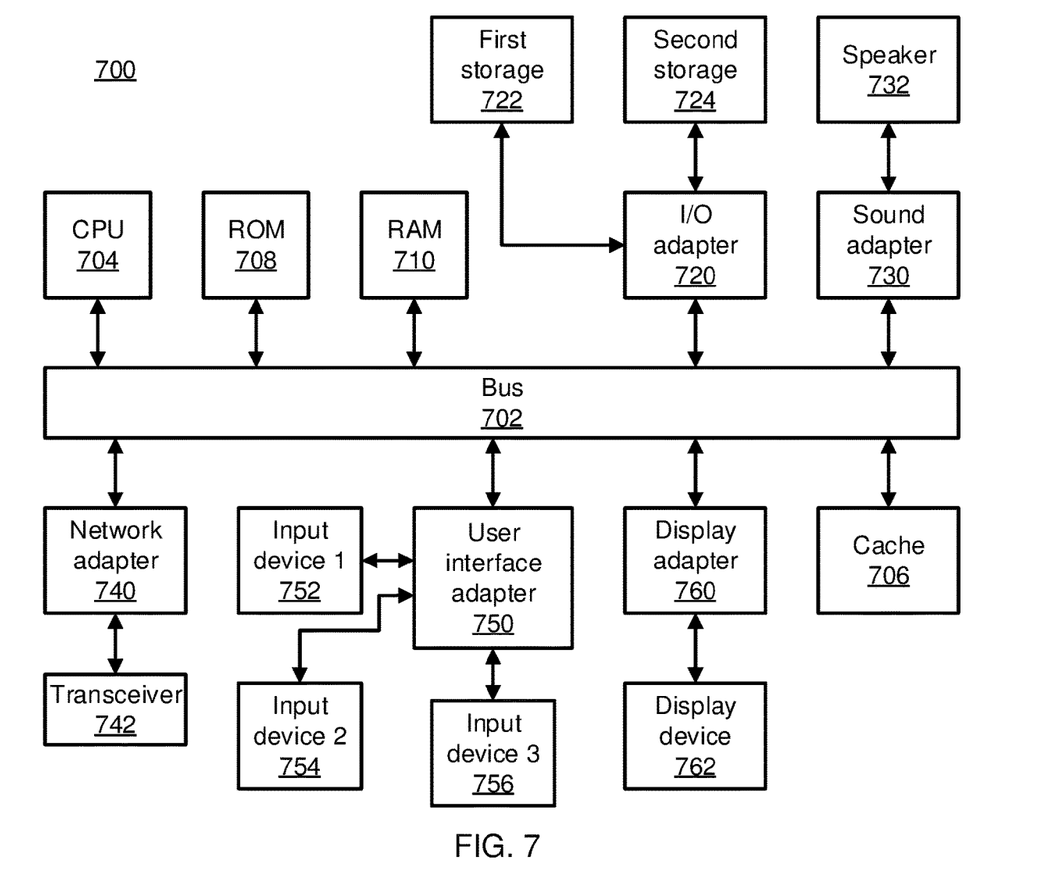
FIG. 7 is a block diagram of a processing system in accordance with an embodiment of the present invention.

Referring now to FIG. 7, an exemplary processing system 700 is shown which may represent the failure detection system 202. The processing system 700 includes at least one processor (CPU) 704 operatively coupled to other components via a system bus 702. A cache 706, a Read Only Memory (ROM) 708, a Random Access Memory (RAM) 710, an input/output (I/O) adapter 720, a sound adapter 730, a network adapter 740, a user interface adapter 750, and a display adapter 760, are operatively coupled to the system bus 702.

A first storage device 722 and a second storage device 724 are operatively coupled to system bus 702 by the I/O adapter 720. The storage devices 722 and 724 can be any of a disk storage device (e.g., a magnetic or optical disk storage device), a solid state magnetic device, and so forth. The storage devices 722 and 724 can be the same type of storage device or different types of storage devices.

A speaker 732 is operatively coupled to system bus 702 by the sound adapter 730. A transceiver 742 is operatively coupled to system bus 702 by network adapter 740. A display device 762 is operatively coupled to system bus 702 by display adapter 760.

A first user input device 752, a second user input device 754, and a third user input device 756 are operatively coupled to system bus 702 by user interface adapter 750. The user input devices 752, 754, and 756 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present principles. The user input devices 752, 754, and 756 can be the same type of user input device or different types of user input devices. The user input devices 752, 754, and 756 are used to input and output information to and from system 700.

Of course, the processing system 700 may also include other elements (not shown), as readily contemplated by one of skill in the art, as well as omit certain elements. For example, various other input devices and/or output devices can be included in processing system 700, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 700 are readily contemplated by one of ordinary skill in the art given the teachings of the present principles provided herein.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for system failure diagnosis and correction, comprising:
    extracting syntactic patterns from a plurality of logs with heterogeneous formats;
    clustering the syntactic patterns according to categories of system failure;
    extracting a single semantically unique pattern for each category of system failure;
    matching the semantically unique patterns to recent log information using a processor to detect a corresponding system failure; and
    performing a corrective action responsive to the detected system failure.

2. The method of claim 1, wherein the syntactic patterns represent structural information regarding the log formats.

3. The method of claim 1, wherein the semantic patterns represent log content information regarding the respective categories of system failure.

4. The method of claim 1, wherein extracting the syntactic patterns comprises embedding each log in a latent vector space.

5. The method of claim 4, wherein a distance metric in the latent vector space represents a degree of similarity between respective syntactic patterns.

6. The method of claim 1, further comprising generating system failure signatures from the semantically unique patterns using automata models that represent sequences of log patterns.

7. The method of claim 6, wherein matching the semantically unique patterns to recent log information comprises identifying sequences in the recent log information that match one or more failure signatures.

8. The method of claim 6, wherein the failure signatures comprise time-order information in the sequences of log patterns.

9. The method of claim 1, further comprising diagnosing the detected system failure by matching the semantically unique patterns to recent log information.

10. The method of claim 1, wherein the corrective action includes at least one of the group consisting of shutting down a system, activating a backup system, rebooting a malfunctioning system, changing power supply settings, changing cooling settings, and changing security settings.

11. A failure diagnosis and correction system, comprising:
    a failure signature module configured to extract syntactic patterns from a plurality of logs with heterogeneous formats, to cluster the syntactic patterns according to categories of system failure, and to extract a single semantically unique pattern for each category of system failure;
    a failure diagnosis module comprising a processor configured to match the semantically unique patterns to recent log information to detect a corresponding system failure; and
    a corrective module configured to perform a corrective action responsive to the detected system failure.

12. The system of claim 11, wherein the syntactic patterns represent structural information regarding the log formats.

13. The system of claim 11, wherein the semantic patterns represent log content information regarding the respective categories of system failure.

14. The system of claim 11, wherein the failure signature module is further configured to embed each log in a latent vector space.

15. The system of claim 14, wherein a distance metric in the latent vector space represents a degree of similarity between respective syntactic patterns.

16. The system of claim 11, wherein the failure signature module is further configured to generate system failure signatures from the semantically unique patterns using automata models that represent sequences of log patterns.

17. The system of claim 16, wherein the failure diagnosis module is further configured to identify sequences in the recent log information that match one or more failure signatures.

18. The system of claim 16, wherein the failure signatures comprise time-order information in the sequences of log patterns.

19. The system of claim 11, wherein the failure diagnosis module is further configured to diagnose the detected system failure by matching the semantically unique patterns to recent log information.

20. The system of claim 11, wherein the corrective action includes at least one of the group consisting of shutting down a system, activating a backup system, rebooting a malfunctioning system, changing power supply settings, changing cooling settings, and changing security settings.

* * * * *